May 5, 1970  R. E. SUMMERER  3,510,836
FLUID LEVEL DETECTOR FOR VEHICLE BRAKE SYSTEMS AND THE LIKE
Filed Dec. 22, 1966

INVENTOR.
Raymond E. Summerer
BY
Hugh L. Fisher
ATTORNEY

United States Patent Office 3,510,836
Patented May 5, 1970

3,510,836
FLUID LEVEL DETECTOR FOR VEHICLE
BRAKE SYSTEMS AND THE LIKE
Raymond E. Summerer, Grand Blanc, Mich., assignor to
General Motors Corporation, Detroit, Mich., a corporation of Delaware
Filed Dec. 22, 1966, Ser. No. 603,846
Int. Cl. B60q 1/00; G08b 21/00
U.S. Cl. 340—59    12 Claims

ABSTRACT OF THE DISCLOSURE

A fluid level detector incorporating a probe that extends into a grounded fluid reservoir and functions as a switch. The probe includes a thermistor and a thermistor heater joined together and arranged in parallel between a voltage source and the grounded fluid reservoir. The thermistor's resistance decreases due to its increase in temperature whenever the probe is no longer immersed in the fluid and the resultant increased current flow energizes a warning device. In a vehicle brake system the brake fluid level is sensed and, in addition, the same warning device advises when the parking brake is engaged.

---

The invention relates to improvements in electrical fluid level detectors adapted, although not exclusively, for use in vehicle fluid systems, such as those for coolant, brakes, and gear boxes.

It is known that a thermistor, which has a high negative temperature coefficient of resistance; i.e., its resistance decreases as its temperature increases, is useful in detecting the presence or absence of fluid. With the thermistor in circuit with a voltage source and immersed in the fluid, the thermistor can by calibration be operated at low enough temperatures so that its resistance is relatively high and accordingly the current flow therethrough is minimal, but when no longer immersed in the fluid its temperature will increase rapidly and accordingly its resistance will decrease. The resultant increased current flow can, therefore, be employed to energize an appropriate readout device.

Although useful for this purpose, the thermistor can present problems. For example, at cold ambient air temperatures the resistance of the thermistor may be too high to allow sufficient current flow therethrough to raise the thermistor's temperature. Therefore, the lack of fluid would not be detected. Or if the current flow is adequate to raise the temperature, it may be too slow for detection purposes. Consequently, a heater may be required if the thermistor is to operate at cold temperatures. Then, since a thermistor is formed of semiconductor material, combining the heater and the thermistor and incorporating them in a detector circuit presents a fabrication problem. Also, the fluid whose level is to be detected may have a deleterious effect on the thermistor.

For overcoming these and other problems, the invention contemplates a novel probe construction that combines a thermistor and a heater so as to provide a substantially increased temperature range of operation that is easily fabricated, and that effectively seals the thermistor from fluid but without interfering with its thermal response.

Somewhat more specifically stated, the invention seeks to provide a new and different probe construction wherein a thermistor and a heater are intimately associated and arranged in parallel within a housing that provides a fluid seal and also electrically connects an external terminal of the probe by way of the thermistor and heater to a conductive fluid reservoir.

Also contemplated by the invention is a probe construction wherein the probe includes a thermistor housing that has a nonconductive part thereof directly attached to a conductive fluid reservoir and a conductive part thereof integrally formed with the nonconductive part to effect a fluid tight seal therebetween and with a tab extending through and to the exterior of the nonconductive part so as to be deformed by and in electrical contact with the reservoir.

Further contemplated by the invention is a probe construction utilizing a housing that is part conductive and part nonconductive with a combined thermistor and heater positioned within the conductive part thereof and electrically isolated therefrom except for electrical contact with a terminal portion that extends through and to the exterior of the housing.

The invention also seeks to provide an unusual fluid level detector circuit including a readout device for advising of fluid level and a novel thermistor type probe for serving as a static switch to connect the readout device to an energizing source when the fluid is at a certain level.

As is well known, there are vehicle brake systems that when the vehicle parking brake is engaged cause an instrument panel mounted lamp to be illuminated. The present invention proposes a unique brake system incorporating a circuit that not only energizes a readout device for advising the vehicle operator when the parking brake is engaged, but also energizes the same device for advising the vehicle operator when the brake fluid is at a certain level. By the invention the circuit incorporates a novel thermistor type fluid level probe that functions as a switch in the circuit and facilitates the use of the readout device for both functions.

The foregoing and other objects and advantages of the invention will become apparent from the following description and the accompanying drawings, in which.

Figure 1:
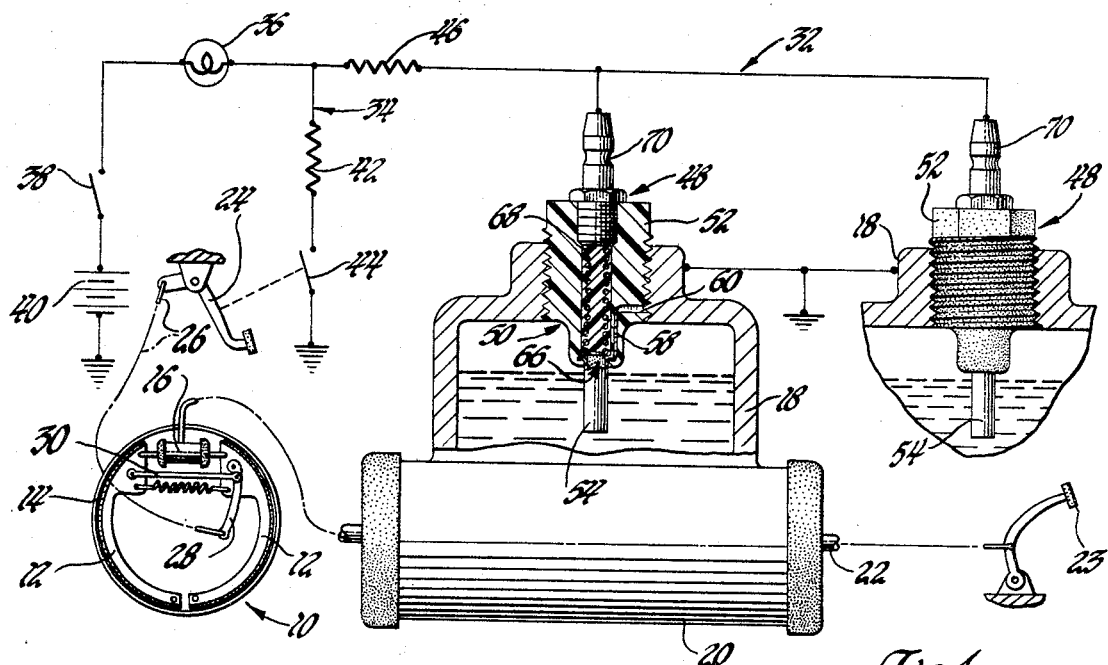
FIG. 1 is a schematic diagram of a vehicle brake system incorporating the principles of the invention.

Referring first to the details of FIG. 1, the brake system displayed includes a wheel brake 10 having the usual shoes 12 positioned within a brake drum 14. A fluid operated wheel cylinder 16, when fluid is supplied thereto, urges the shoes 12 into engagement with the drum 14 to produce the wheel braking in a known way. The fluid for the wheel cylinder 16 is derived from a reservoir or container or what is commonly known as a master cylinder 18. In the illustrated dual master cylinder system, each master cylinder 18 may serve two of the four wheel brakes; e.g., one serves the front wheel brakes and the other the rear wheel brakes. Associated with this master cylinder 18 is a piston assembly 20 that includes a push rod 22 that is actuated by the usual brake pedal 23. When the brake pedal 23 is depressed, the piston assembly 20 causes fluid from the master cylinder 18 to be supplied to the wheel cylinder 16 and the brakes to be engaged. This brake operation is conventional and, therefore, further detailed explanation is not necessary for understanding the invention.

In addition, the brake system includes a parking brake comprising a parking brake pedal 24, which is connected by a linkage 26 to an actuating lever 28. This actuating lever 28 when rotated clockwise by the pedal 24 causes, through a spreader bar 30, the shoes 12 to be mechanically operated and urged into engagement with the drum 14, again in the usual way.

This brake system incorporates a circuit for advising both when the parking brake is engaged and when the brake fluid is at some level beyond which vehicle operation would not be recommended. This circuit incorporates a fluid level detector branch 32 and a parking brake branch 34, both of which are connected through a readout device such as a warning lamp 36 and an ignition switch 38 to a voltage source, which in this system is the usual twelve-volt vehicle battery, denoted at 40, and having one terminal grounded in the customary way to the vehicle frame (not shown). The lamp 36, by way of suggestion, would preferably be mounted on the vehicle's instrument panel (not shown). It should, however, be kept in mind that almost any other type of device can provide this readout information; e.g., a buzzer could be employed or a guage calibrated to provide fluid levels.

Considering first the parking brake branch 34, there is included a resistance 42 corresponding to the resistance in the usual related wiring harness and a switch 44, which is appropriately grounded also to the vehicle frame. The switch 44 is suitably connected to the parking brake pedal 24 so that when the parking brake pedal 24 is in the engaged position and accordingly the wheel brake is engaged, the switch 44 is closed. Consequently, assuming the ignition switch 38 is also closed, the lamp 36 is connected in circuit with the battery 40 and illuminated. The illuminated lamp 36 advises the vehicle operator that his parking brake is on when the ignition switch 38 is closed and will remain on until the parking brake is disengaged.

Figure 3:
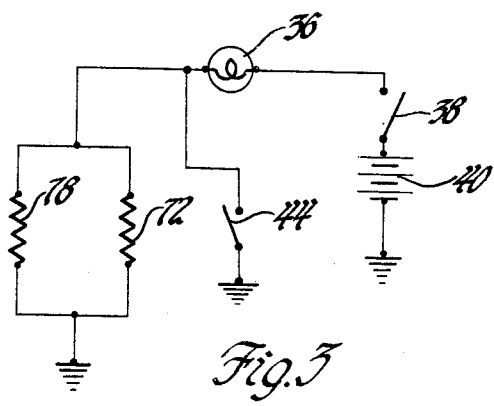
FIG. 3 is a schematic diagram of the probe's equivalent circuit.

The fluid level detector branch 32 also includes a resistance, assigned the numeral 46, which corresponds to the resistance of the related wiring harness, and two probes designated by the numeral 48. The two probes 48 in the depicted dual master cylinder system are connected in parallel. These probes 48 may be individually connected to the lamp 36 or to separate lamps 36, as shown in FIG. 3, and as will be discussed.

The probes 48 are identical and, hence, only one will be described. The probe 48 is of the thermistor type and functions in the branch 32 as a static switch. Characteristically, a thermistor has a very high negative temperature coefficient of resistance when immersed in fluid and its temperature will be maintained low enough and, correspondingly, its resistance sufficiently high to prevent any significant current flow therethrough. This is equivalent to an open switch setting or the switch "off" condition. However, when the fluid level does diminish to some level that approximates one that should be investiagted, the thermistor will no longer be immersed in fluid or only partially immersed in fluid and the heat generated by the slight current flow therethrough will no longer be dissipated. Consequently, the thermistor will commence to heat up. Its resistance will decrease and, accordingly, the current flow therethrough will increase to some equilibrium point where the temperature remains relatively constant. This corresponds to the switch closed setting or switch "on" condition.

Figure 2:
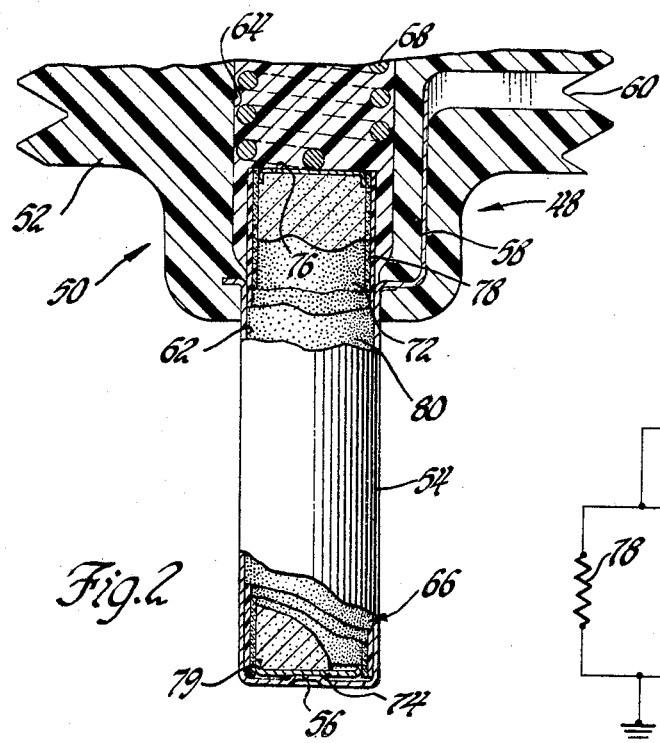
FIG. 2 is an enlarged fragmentary view of a thermistor type probe utilized in the FIG. 1 system.

Relating the foregoing to the details of the probe 48, reference is made to FIG. 2. In describing this probe 48 and the associated circuitry, various sizes and materials will be suggested with relation to the preferred embodiment. These sizes and materials are not to be considered in any way to limit the invention and are subject to considerable variation as those versed in the art will appreciate. As illustrated, the probe 48 has a housing denoted at 50. This housing 50 includes an externally threaded, hex-headed part 52 formed of a nonconductive material, such as an epoxy molding compound sold under the trade name Epiall-1914. Attached to the part 52, and preferably this attachment is made when the part 52 is molded, is a hollow, cylindrical shell 54 made of a conductive material. This material should not only be a good current conductor but also have good thermal conduction characteristics. Brass has been found very satisfactory. The shell 54 has a closed and indented end 56 and a finger or tab 58 that is, during the molding operation, caused to extend through the part 52, as illustrated, to the exterior thereof at 60 such that when the part 52 is threaded to the master cylinder 18 the tab 58 is deformed and urged in electrical contact with the cylinder 18, as shown in FIG. 1. This deformed part of the tab 58 thus performs as a terminal and connects the probe 48 to the master cylinder 18, which is made of a conductive material such as steel and appropriately grounded to the vehicle frame.

The opening in the shell 54, which has been assigned the numeral 62, is aligned with a through opening 64 in the hex-headed part 52 so that a thermistor heater assembly, shown generally at 66, can be installed therein, followed by a helical coil spring 68 and a terminal (see FIG. 1) 70, which is threadedly engaged to the hex-headed part 52. The terminal 70 is preferably made of brass and is in electrical contact with the spring 68, which is in turn in electrical contact, as will be described with the thermistor heater assembly 66. The coil spring construction is preferred because it does not tend to act as a heat sink by absorbing heat from the thermistor as perhaps a solid elongated conductor would. Of course, if the heat of the thermistor were absorbed in this way, calibration would be difficult and operation somewhat unpredictable. Also, the coil spring 68 should be capable of withstanding high temperatures. A suggested material is stainless steel. A spring with a wire of .024 inch in diameter and 12.3 active coils has performed very satisfactorily in the preferred embodiment.

Continuing to refer to FIG. 2, the thermistor heater assembly 66 includes a thermistor 72 having an elongated, cy.indrical body with relatively flat ends 74 and 76. The thermistor 72 may be formed of any well known semiconductor material with the appropriate negative temperature coefficient desired. For instance, the material disclosed in Pat. No. 2,786,819 to Smith et al. with a resistance of 175 ohms to 210 ohms at 310° F. with a maximum current of 2.0 ma. therethrough. To the ends 74 and 76 is applied a layer of conductive material; e.g., nickel, so that the overall length is approximately .370 inch. These nickel ends 74 and 76 are in electrical contact respectively with the coil spring 68 and the indented portion of the closed end 56 of the shell 54. Around the body of the thermistor 72 is applied a layer of electrically conductive resistance material 78, such as a suitable combination of graphite and a metal oxide; e.g., that is known by the tradename "dag" Dispersion #440 made by the Acheson Colloids Company. This layer of resistance material 78 is approximately .002 inch thick. Hence, if it is assumed by way of suggestion that the diameter of the thermistor is .098 inch, the diameter will become approximately .102 inch. This resistance material may be sprayed directly onto the exterior of the thermistor 72 and by an appropriate firing process at a relatively high temperature is caused to adhere thereon. The resistance material must have electrical communication with the nickel ends 74 and 76. This may be done by extending the nickel ends 74 and 76 approximately ten-thousandths of an inch around the ends of the thermistor body as illustrated at 79, or the resistance material 78 may extend around the ends of the nickel ends 74 and 76. As can be appreciated, from and between the nickel ends 74 and 76 there are now two current paths, one through the thermistor 72 itself and the other by way of the resistance material 78.

For purposes of subsequent explanation the resistance material 78 will hereinafter be referred to as the heater resistor 78. With the suggested thickness and materials, the heater resistor 78 will provide about 12 milliwatts, 1° C. to insure a temperature rise sufficient for self heating of the thermistor 72 at low ambient air temperatures.

To electrically isolate the heater resistor 78 from the brass shell 54 a thin layer of insulating material 80, such as that known by the tradename Teflon, is applied over the heater resistor 78. The diameter now of the assembly may be .103 inch, by way of example, to provide this electrical isolation but without interfering with the necessary thermal conductivity wanted for satisfactory results.

Reference is now made to FIG. 3. In this diagram the thermistor 72 and the heater resistor 78 are depicted as resistances. Preferably, at room temperatures of about 75° F. the resistances of the thermistor 72 and the heater resistor 78 would be 4,000 to 5,000 ohms and approximately 225 ohms, respectively. As explained, if the thermistor 72 is in a very cold environment, and both the brake fluid and the ambient air are so cold that the resistance of the thermistor 72 is too high for any significant amount of current to flow therethrough for self-heating the thermistor 72 or the self-heating requires several minutes, the thermistor 72 cannot perform satisfactorily to detect the presence or lack of brake fluid. For this reason the heater resistor 78 is arranged in parallel with the thermistor 72 and as long as the ignition switch 38 is closed a low resistance path is provided through the heater resistor 78 for the current to provide heating for the thermistor 72. The amount of current flow is not adequate to illuminate the lamp 36 but is sufficient to warm the thermistor 72 so as to increase its current flow and then it can commence self-heating. This heater resistor 78, therefore, enables the thermistor 72 to be used in ambient air temperatures as low as —20° F. and as high as 230° to 240° F. In fluid at —20° F., the fluid would dissipate the heat and the "off" condition would continue. Therefore, when the shell 54 is immersed in brake fluid, this heat provided by the heater resistor 78 is absorbed in the fluid and the total current flow through both the heater resistor 78 and the thermistor 72 is not adequate to illuminate the lamp 36 which requires about 350 ma. at 6 volts. However, as soon as there is a lack of fluid to carry away this heat, the temperature of the thermistor 72 increases very rapidly and may approach an equilibrium temperature of 500° to 600° F. in the "on" condition. The resistance, of course, of the thermistor 72 decreases considerably so that the resultant slubstantially increased current flow in the "on" condition will illuminate the lamp 36. In the preferred embodiment with the ambient air at a temperature of —20° F., the "on" condition occurs in approximately sixty seconds.

As was suggested, when using the probe 48 in a brake system there can be individual probes 48 and lamps 36 for advising which of the dual master cylinders 18 has a low fluid level. The circuit in FIG. 3 would, therefore, be the same for each master cylinder 18 with the lamps 36 appropriately designated as to which master cylinder 18 they related. The parking brake switch 44 can be used with one or both of these circuits.

Briefly again describing the operation of the probe 48 and its use in the FIG. 1 system, when the vehicle operator closes the ignition switch to commence operating the vehicle, the lamp 36 will illuminate provided the parking brake is engaged so as to close the parking brake switch 44. This completes the parking brake branch 34 which extends from the battery 40 through the lamp 36, the vehicle frame, and back to the ground terminal of the battery 40.

The current flow in the fluid level detector branch 32 with the ignition switch 38 closed will be from the battery 40, through the probes 48, the cylinders 18, the vehicle frame, and to the grounded terminal of the battery 40. If subsequently after the parking brake is disengaged, the level of the brake fluid in either master cylinder 18 is below some selected level, the current flow through the heater resistor 78 and the thermistor 72 in the probe 48 in this cylinder 18 with the low fluid level will generate heat which is no longer dissipated. This heat will increase the temperature of the thermistor 72 so that its resistance will decrease rapidly to the point where the total current flow through the heater resistor 78 and the thermistor 72 by way of the tab 58 to the grounded master cylinder 18 will be sufficient to illuminate the lamp 36, and the operator will know that one or both of the master cylinders 18 have a low level of brake fluid. Of course, if the FIG. 3 system is used there will be a lamp 36 for each cylinder 18 and the operator will know whether one or both and which one of the cylinders 18 has a low fluid level.

As will now be appreciated, a much simplified thermistor heater assembly 46 is provided that enables the probe 48 to be easily fabricated and that has the electrical connections for providing a very effective and efficiently operating static switch such that a substantial temperature range variation can be accommodated to give quick, reliable low brake fluid level warning. Additionally, the probe construction is easily combined in circuit with other switches such as the parking brake switch 44 to furnish operator condition information about not only the level of fluid in the brake cylinders but also about the parking brake.

It should be kept in mind that although the probe 48 has been described as in conjunction with a brake master cylinder, the probe 48 can be utilized to sense fluid level in any system whether related to a vehicle or not. If related to a vehicle, the probe 48 could sense the level of the coolant in the radiator, or the level of the fluid in the power steering gear box, the transmission or the rear axle, and appropriate lamps provided for the readout information about the level.

What is claimed is:

1. A probe comprising a housing, the housing including a closed end portion formed of conductive material and an open end portion formed of nonconductive material; the conductive closed end portion having terminal means; a thermistor positioned within the closed end portion; the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the conductive closed end portion of the housing; the thermistor being positioned within the closed end portion so that one end surface is in electrical communication with the terminal means; a terminal joined to the open end portion of the housing; and means electrically connecting the terminal to the other end surface of the thermistor so that the resistance material and the thermistor provide parallel current paths between the terminal and the terminal means.

2. A probe comprising a housing adaptable for connection to a conductive container, the housing including a closed end portion formed of conductive material and an open end portion formed of nonconductive material; the portions providing a passageway; terminal means extending from the conductive closed end portion to the exterior of the nonconductive open end portion; the terminal means deforming when the housing is secured to the container to electrically connect the conductive closed end portion to the container; a thermistor positioned within the passageway in the closed end portion; the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the conductive closed end portion of the housing; the thermistor having one end surface in electrical communication with the closed end portion of the housing; a terminal joined to the open end portion of the housing; and means within the passageway electrically connecting the terminal to the other end surface of the thermistor so that the resistance material and the thermistor provide parallel current paths between the terminal and the terminal means.

3. A probe comprising a hollow housing adaptable for connection to a conductive container, the housing including a closed end portion formed of conductive material and an open end portion formed of nonconductive material; the closed end portion having the end indented inwardly towards the passageway; terminal means extending from the conductive closed end portion through the nonconductive open end portion and to the exterior thereof; the terminal means being arranged so as to electrically connect the conductive closed end portion to the conductive container; a thermistor positioned within the closed end portion; the thermistor having an elongated, cylindrical body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the conductive closed end portion of the housing; the thermistor being positioned within the closed end portion so that one end surface is engaged with and in electrical communication with the inwardly indented end of the closed end portion of the housing; a terminal joined to the open end portion of the housing; and coil spring means electrically connecting the terminal to the other end surface of the thermistor so that the resistance material and the thermistor provide parallel current paths between the terminal and the terminal means.

4. A probe comprising a nonconductive, hollow, cylindrical housing; the housing having external means to permit the housing to be attached to a conductive container; a conductive, hollow, cylindrical shell having a flanged open end, a closed inwardly indented end, and a tab extending from the open end; the conductive shell and the nonconductive housing being joined with the flanged open end embedded in the housing so as to provide a fluid sealing engagement therebetween with the tab embedded in the housing and extending through the threads of the housing to the exterior thereof and so as to be deformed when the housing is connected to the container and provide an electrical connection between the shell and the container; a thermistor positioned within the shell; the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the shell; the thermistor being positioned within the shell so that one end surface is in engagement with and in electrical communication with the inwardly indented end of the shell; a terminal joined to the open end portion of the housing; and means electrically connecting the terminal to the other end surface of the thermistor so that the resistance material and the thermistor provide parallel current paths between the terminal and the tab.

5. A probe comprising a nonconductive, hollow, cylindrical housing; the housing having external threads to permit the housing to be threadedly connected to a conductive container; a conductive, hollow, cylindrical shell having an outwardly flanged open end, a closed inwardly idented end, and a tab extending from the open end; the conductive shell and the nonconductive housing being joined with the flanged open end embedded in the housing so as to provide a fluid sealing engagement therebetween and so as to provide a continuous passageway extending through the housing and the shell and terminating at the closed end of the shell; the housing and the shell also being joined with the tab embedded in the housing and extending through the threads of the housing to the exterior thereof so as to be deformed when the housing is connected to the container and provide an electrical connection between the shell and the container; a thermistor positioned within the shell; the thermistor having an elongated, cylindrical body and opposite end surfaces, electrically conductive material joined to the end surfaces, resistance material joined directly to the body and also in electrical communication with the conductive material so as to provide a heater for the thermistor when current is supplied thereto, and a layer of insulating material surrounding the resistance material so as to electrically isolate the resistance material from the shell, the thermistor having one end surface thereof engaged with and in electrical communication with the inwardly indented end of the shell; a terminal joined to the end of the housing opposite the shell; and a conductive elongated coil spring electrically connecting the terminal to the other end surface of the thermistor so that the resistance material and the thermistor provide parallel current paths between the terminal and the tab.

6. A detector for the level of fluid in a container comprising, in combination, a voltage source; a readout device; and switch means operative in response to the level of the fluid in the container for causing the voltage source to energize the readout device when the fluid is at a certain level; the switch means including a housing having a closed end portion formed of conductive material and extending into the container and an open end portion formed of nonconductive material and extending externally of the container; the conductive closed end portion having terminal means adapted to be connected to the source; a thermistor positioned within the closed end portion, the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the conductive closed end portion of the housing, the thermistor being positioned within the closed end portion so that one end surface is in electrical communication with the terminal means; a terminal connected to the readout device and joined to the open end portion of the housing; and means electrically connecting the terminal to the other end surface of the thermistor so that the resistance material and the thermistor provide parallel current paths between the terminal and the terminal means, the thermistor being operative to attain a predetermined temperature so that the corresponding resistance thereof permits a certain current flow therethrough adequate to energize the readout device at the certain level of the fluid.

7. A detector for the level of fluid in a conductive container comprising, in combination, a voltage source in circuit with the container; a readout device; and switch means operate in response to a certain level of the fluid in the container to connect the readout device to the voltage source; the switch means including a probe having a nonconductive, hollow, cylindrical housing, the housing having external means to permit the housing to be attached to the container, a conductive, hollow, cylindrical shell having a flanged open end, a closed inwardly indented end, and a tab extending from the open end, the conductive shell and the nonconductive housing being joined with the flanged open end embedded in the housing so as to provide a fluid sealing engagement therebetween with the tab embedded in the housing and extending through the threads of the housing to the exterior thereof and so as to be deformed when the housing is connected to the container and provide an electrical connection between the shell and the container, the housing being attached to the container so that the sell extends into the container in the vicinity of the certain level, a thermistor positioned within the shell, the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the shell, the thermistor being positioned within the shell so that one end surface is in engagement with and in electrical communication with the inwardly indented end of the shell, a terminal connected to the readout device and joined to the open end portion of the housing, and means electrically connecting the terminal to the other end surface of the thermistor so that the resistance material and the thermistor provide parallel current paths between the terminal and the tab, the thermistor being operative to attain a predetermined temperature so that the corresponding resistance thereof permits a certain current flow adequate to energize the readout device at the certain level of the fluid.

8. A detector for the level of a fluid in a conductive container comprising, in combination, a voltage source in circuit with the container; a warning device; and a switch means operative in response to the level of the fluid in the container for completing a circuit extending from the voltage source through the warning device, the container, and back to the voltage source when the level of the fluid is below a certain level; the switch means including a probe having a nonconductive, hollow, cylindrical housing, the housing having external threads to permit the housing to be threadedly connected to a conductive container; a conductive, hollow, cylindrical shell having an outwardly flanged open end, a closed inwardly indented end and a tab extending from the open end; the conductive shell and the nonconductive housing being joined with the flanged open end embedded in the housing so as to provide a fluid sealing engagement therebetween and so as to provide a continuous passageway extending through the housing and the shell and terminating at the closed end of the shell; the housing and the shell also being joined with the tab embedded in the housing and extending through the threads of the housing to the exterior thereof so as to be deformed when the housing is connected to the container and provide an electrical connection between the shell and the container, a thermistor positioned within the shell, the housing being connected to the container so that the shell extends into the container in the vicinity of the certain level, the thermistor having an elongated, cylindrical body and opposite end surfaces, electrically conductive material joined to the end surfaces, resistance material joined directly to the body and also in electrical communication with the conductive material so as to provide a heater for the thermistor when current is supplied thereto, and a layer of insulating material surrounding the resistance material so as to electrically isolate the resistance material from the shell, the thermistor having one end surface thereof engaged with and in electrical communication with the inwardly indented end of the shell; a terminal connected to the readout device and joined to the end of the housing opposite the shell so as to extend externally of the container; and a conductive elongated coil spring electrically connecting the terminal to the other end surface of the thermistor so that the resistance material and the thermistor provide parallel current paths between the terminal and the tab, the thermistor being operative to attain a certain temperature so that the resistance thereof permits a certain current flow adequate to energize the warning device when fluid falls to the certain level.

9. In a vehicle brake system, a wheel brake fluid pressure means for operating the brake, a conductive fluid reservoir, manually controlled means for selectively causing fluid from the reservoir to be supplied to the fluid pressure means so as to operate the brakes, manually controlled parking brake means selectively operative to also engage the wheel brake, circuit means both for advising when the parking brake means is operative and the wheel brake is engaged and for advising about the level of the fluid in the reservoir, the circuit means including a voltage source, a readout device, switch means operated by the parking brake means when operative to electrically connect the voltage source to the readout device so as to energize the readout device, and switch means sensing the level of the fluid in the reservoir and operative when the fluid is at a certain level to connect the voltage source and the fluid reservoir in circuit with the readout device so as to also energize the readout device, the switch means including a thermistor and a heater for the thermistor, the thermistor being operative when the fluid is at the certain level to attain a predetermined temperature so that the resistance thereof permits a certain current flow therethrough adequate to energize the readout device.

10. In a vehicle brake system, a wheel brake fluid pressure means for operating the brake, a fluid reservoir formed of a conductive material, manually controlled means for selectively causing fluid from the reservoir to be supplied to the fluid pressure means so as to operate the brakes, manually controlled parking brake means selectively operative to also engage the wheel brake, circuit means both for warning when the parking brake means is operative and the wheel brake is engaged and for warning when the fluid in the reservoir is below a certain level, the circuit means including a voltage source, a warning device, switch means operated by the parking brake means when operative to electrically connect the voltage source to the warning device so as to energize the warning device, switch means sensing the level of the fluid in the reservoir and operative when the fluid is below the certain level to connect the voltage source and the fluid reservoir in circuit with the warning device so as to energize the warning device, the switch means including a housing having a closed end portion formed of conductive material and extending into the reservoir and an open end portion formed of nonconductive material and extending externally of the reservoir, the conductive closed end portion having terminal means adapted to be connected to the voltage source, a thermistor positioned within the closed end portion, the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the conductive closed end portion of the housing, the thermistor being so positioned within the closed end portion so that one end surface is in electrical communication with the terminal means, a terminal connected to the warning device and joined to the open end portion of the housing, and means electrically connecting the terminal to the other end surface of the thermistor so that the resistance material and the thermistor provide parallel current paths between the terminal and the terminal means, the thermistor being operative when the fluid is below the certain level to attain a predetermined temperature so that the corresponding resistance thereof permits certain current flow therethrough adequate to energize the warning device.

11. In a vehicle brake system, a wheel brake fluid pressure means for operating the brake, a fluid reservoir formed of conductive material, manually controlled means for selectively causing fluid from the reservoir to be supplied to the fluid pressure means so as to operate the brakes, manually controlled parking brake means selectively operative to also engage the wheel brake, circuit means both for warning when the parking brake means is operative and the wheel brake is engaged and for warning when the fluid in the reservoir is below a certain level, the circuit means including a voltage source, a warning device, switch means operated by the parking brake means when operative to electrically connect the voltage source to the warning device so as to energize the warning device, switch means sensing the level of the fluid in the reservoir and operative when the fluid is below the certain level to also connect the voltage source and the fluid reservoir in circuit with the warning device so as to energize the warning device, the switch means including a probe having a nonconductive, hollow, cylindrical housing, the housing having external means to permit the housing to be attached to the reservoir, a conductive, hollow, cylindrical shell having a flanged open end, a closed inwardly indented end, and a tab extending from the open end, the conductive shell and the nonconductive housing being joined with the flanged open end embedded in the housing so as to provide a fluid sealing engagement therebetween with the tab embedded in the housing and extending through the threads of the housing to the exterior thereof and so as to be deformed when the housing is connected to the container and provide an electrical connection between the shell and the reservoir, the housing being attached to the reservoir so that the shell extends into the reservoir in the vicinity of the certain level, a thermistor positioned within the shell, the thermistor having a body and opposite end surfaces, electrically conductive material joined to the end surfaces, resistance material joined directly to the body and also in electrical communication with the conductive material so as to provide a heater for the thermistor, and a layer of insulating material surrounding the resistance material so as to electrically isolate the resistance material from the shell, the thermistor being positioned within the shell so that one end surface is in engagement with and in electrical communication with the inwardly indented end of the shell, a terminal connected to the warning device and joined to the open end portion of the housing, and means electrically connecting the terminal to the other end surface of the thermistor so that the resistance material and the thermistor provide parallel current paths between the terminal and the tab; the thermistor being operative when the fluid is below the certain level to attain a predetermined temperature so that the corresponding resistance thereof permits a certain current flow adequate to energize the warning device.

12. In a vehicle brake system, a wheel brake fluid pressure means for operating the brake, a fluid master cylinder formed of conductive material and grounded, manually controlled means for selectively causing fluid from the master cylinder to be supplied to the fluid pressure means so as to operate the brakes, manually controlled parking brake means selectively operative to also engage the wheel brake, circuit means both for warning when the parking brake means is operative and the wheel brake is engaged and for warning when the fluid in the master cylinder is below a certain level, the circuit means including a battery having grounded and power terminals, a warning lamp, switch means operated by the parking brake means when operative to electrically connect the battery power terminal to the warning lamp so as to energize the warning lamp, switch means sensing the level of the fluid in the master cylinder and operative when the fluid is below the certain level to connect the warning lamp to the battery power terminal and the grounded master cylinder so as to energize the warning lamp, the switch means including a probe having a nonconductive, hollow, cylindrical housing, the housing having external threads to permit the housing to be threadedly connected to a conductive master cylinder, a conductive, hollow, cylindrical shell having an outwardly flanged open end, a closed inwardly indented end, and a tab extending from the open end; the conductive shell and the nonconductive housing being joined with the flanged open end embedded in the housing so as to provide a fluid sealing engagement therebetween and so as to provide a continuous passageway extending through the housing and the shell and terminating at the closed end of the shell; the housing and the shell also being joined with the tab embedded in the housing and extending through the threads of the housing to the exterior thereof so as to be deformed when the housing is connected to the master cylinder and provide an electrical connection between the shell and the master cylinder, a thermistor positioned within the shell, the housing being connected to the container so that the shell extends into the master cylinder in the vicinity of the certain level, the thermistor having an elongated, cylindrical body and opposite end surfaces, electrically conductive material joined to the end surfaces, resistance material joined directly to the body and also in electrical communication with the conductive material so as to provide a heater for the thermistor when current is supplied thereto, and a layer of insulating material surrounding the resistance material so as to electrically isolate the resistance material from the shell, the thermistor having one end surface thereof engaged with and in electrical communication with the inwardly indented end of the shell; a terminal connected to the warning lamp and joined to the end of the housing opposite the shell so as to extend externally of the container; and a conductive elongated coil spring electrically connecting the terminal to the other end surface of the thermistor so that the resistance material and the thermistor provide parallel current paths between the terminal and the tab, the thermistor being operative when the fluid is below the certain level to attain a predetermined temperature so that the resistance thereof permits a certain current flow therethrough adequate to energize the warning lamp.

References Cited

UNITED STATES PATENTS 3,432,840   3/1969   Neapolitakis et al. ___ 340—244

FOREIGN PATENTS 887,479   11/1960   Great Britain.

ALVIN H. WARING, Primary Examiner

U.S. Cl. X.R.

200—61.04, 152; 317—132; 340—69, 244

PO-1050
(5/69)

UNITED STATES PATENT OFFICE
CERTIFICATE OF CORRECTION

Patent No. 3,510,836            Dated May 5, 1970

Inventor(s)        Raymond E. Summerer

It is certified that error appears in the above-identified patent and that said Letters Patent are hereby corrected as shown below:

> Column 5, line 37, delete "slubstantially" and insert -- substantially --. Column 6, line 5, delete "46" and insert -- 66 --. Column 8, line 51, delete "operate" and insert -- operative --; line 67, delete "sell" and insert -- shell --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents